May 13, 1969 G. GOLDAMMER ET AL 3,443,285
APPARATUS FOR OPENING BALES OF FIBRES
Filed Nov. 15, 1966 Sheet 4 of 5

INVENTORS
GEORG GOLDAMMER & GUENTER MAHRT
BY
ATTORNEYS

3,443,285
APPARATUS FOR OPENING BALES OF FIBRES
Georg Goldammer and Günter Mahrt, Ingolstadt, Germany, assignors to Deutscher Spinnereimaschinenbau Ingolstadt Niederlassung der Schubert & Salzer Maschinenfabrik Aktiengesellschaft, Ingolstadt, Donau, Germany, a corporation of Germany
Filed Nov. 15, 1966, Ser. No. 594,501
Int. Cl. D01b 1/00
U.S. Cl. 19—81
11 Claims

ABSTRACT OF THE DISCLOSURE

Apparatus for removing fibres from a bale, including grasping means adapted to grasp and remove a predetermined quantity of fibres from the bale in a layer of predetermined thickness in such manner that the character of the fibre layer is not destroyed or seriously changed.

---

This invention relates in general to equipment for handling fibres, and more particularly to an apparatus for opening fibre bales, especially compressed cotton bales, whereby the fibre material is peeled in strips from the bale and laid upon a conveying means.

Apparatus for the opening of fibre bales are already known in many different forms. The pressed fibre bales are, for example, laid on grids, and the fibre material is removed in tufts from the bottom of the bale by needle belts working over the entire width of the bale (U.S. Patent 1,545,367). It is also in the prior art to carry the cotton bales by means of conveyor belts or roller conveyors over grids through which rotating beaters or grippers with a pincer-like action extend and pluck the fibre material out of the bale (German Patents 1,098,415 and 1,100,518).

It is likewise in the prior art to lay the cotton bales on a platform elevator and urge it upward against a horizontally disposed, endless needle cloth that is driven and acts upon the entire top surface of the bale (U.S. Patent 2,221,262).

These prior art apparatus have the disadvantages that their efficiency is relatively low, and that for each bale of the mixture a separate apparatus must be set up, resulting in high purchase costs.

These disadvantages are avoided in the present invention by the fact that the fibre material is gripped and removed mechanically in successive strips, pairs of grippers which cooperate in the manner of pincers being arranged in a row and driven commonly, the gripper pairs plunging together into the bales and being lifted together from the bale after the cotton has been seized.

The removal of the layers of fibre from the bale by the pincer-like action of pairs of gripper fingers has the advantage that the opening of the bales can be performed in imitation of hand work by a single gripping device on as many bales as desired, and that at the same time a precisely determined amount of fibres is removed from every bale to the exclusion of any human factor on the part of the operating personnel. In this manner, an approximately constant mixture of the fibre from different bales is assured.

Essentially, the invention provides an apparatus for removing strips of fibres from bales thereof in which the fibres are gripped by a plurality of finger members supported on a moveable carrier means, which itself is supported on a base means. The carrier means is moveable relative to the base means from a position of proximity to a bale of fibres located therealong to receive strips of fibres removed therefrom by the finger members, to a position where such fibre strips are delivered onto a receiving means, such as a conveyor. The finger members are arranged for pivotal movement toward one another to grip fibres contained in the bale for removal in strips therefrom, and for pivotal movement apart to release the strips for delivering to the receiving means.

According to a preferred embodiment of the invention, the finger members associated with each carrier means, two or more of which can be carried by the same base means, are arranged in a pair of parallel rows, each row containing a similar number of finger members disposed in opposite relation to corresponding finger members of the other row.

Pivoting of these paired rows of finger members is accomplished by a corresponding pair of shafts journalled to the carrier means. These shafts are parallel to each other and are each connected to the finger members of a corresponding row thereof. The shafts are arranged for limited pivotal movement concurrently and in opposite directions relative to the carrier means.

Such pivotal movement is effected by a linkage having crank members connected one to each shaft, with the linkage being connected to an actuator, expediently supported by the base means, which actuator is operable to selectively pivot the shafts, and hence the rows of finger members toward each other for fibre gripping action, and away from each other into a fibre-releasing position.

The same actuator as used for pivoting the finger rows can be used for moving the carrier means between its fibre-gripping and fibre-releasing positions, or, as desired, a separate actuator can be provided for such purpose.

Preferably, the carrier means is arranged for movement above the bales, so that the finger rows are brought down in a spread apart condition upon the upper portion of the bale, are driven into the bale, either by the weight of the carrier means or forcibly, as by one of the aforementioned actuators, pivoted together to grip a strip of fibre, and then raised upward from the bale to peel off the fibre strip. After the fibre strip has been peeled from the bale, the carrier means can then be shifted into its delivery position and the finger rows spread apart to release the strip.

To limit the width of the fibre strips removed from the bales, a pair of hold-down bar members are slidable connected to the carrier means. Whenever the carrier means is brought down upon a bale, these parallel hold-down members contact the bale first, and press against it of their own weight so that the finger members which are brought down between the hold-down members grip and remove a fibre strip from the bale that is limited in width substantially equal to the spacing of the hold-down members.

The invention provides a choice of a variety of available carrier means motion paths, which are appropriate to specific receiving means and bale supply arrangements.

While the apparatus of the invention can be constructed with a stationary base means, in order to service a single bale location, a base means which is moveable along a guide track is much more useful. According to a preferred embodiment of the invention, one or more bale supports are provided at predetermined positions along the guide track path so that as the base means travels, the carrier means and gripping fingers can be positioned to remove strips from successive portions of bales placed upon the various bale supports.

A main conveyor extending along a path generally parallel to the guide track, and passing by each bale support is arranged to receive fibre strips removed by the gripping fingers and to convey such strips to a remote location, or to some other handling means.

The bale supports are expediently disposed at separated spaced-apart locations along the guide track path, and the main conveyor extends underneath each of the bale supports to receive fibre strips dropped by the gripping fingers as they travel with the base means over the exposed portions of the conveyor lying between successive bale supports.

Alternatively, the main conveyor can extend alongside the bale supports, so that they need not be spaced to provide fibre strips dropping intervals, as in the case where the main conveyor runs underneath the bale supports. However, with this alternative arrangement, a transfer conveyor, supported by the base means for movement therewith is provided. Such transfer conveyor need only be long enough to receive fibre strips dropped by the gripping fingers and to convey such strips over the bales to the main conveyor along a path extending transversely to that of the main conveyor and guide track. The transfer conveyor is connected to the base means for limited pivotal movement relative thereto so that it can be swung away from the gripping fingers when they are brought down against the bale, and swung under the gripping fingers when they have been raised after removing a fibre strip. Thus, the transfer conveyor does not interfere with the action of the carrier means and gripping fingers, and is placed under the gripping fingers when needed to catch strips released therefrom.

As a further alternative, the main conveyor can be located for extension directly underneath, or in closely adjacent underlying relation to the guide track. Since the bale supports are then located alongside the guide track and main conveyor, the carrier means is pivotally connected to the travelling base means so that it can be swung over the bales on the supports for strip removal, and then swung over the guide track and main conveyor to drop such strips thereupon. The guide track can be either a single rail or a double rail type, but in either case is so constructed and arranged that when the carrier means is swung over the main conveyor, the strips dropped will not catch or snag on the guide track.

It is therefore, an object of the invention to provide an apparatus for removing strips of fibres from bales thereof.

Another object of the invention is to provide an apparatus as aforesaid which is capable of servicing a plurality of bales stationed at locations along a fixed path.

A further object of the invention is to provide an apparatus as aforesaid including means for controlling the quantity of fibre contained in each removed strip to facilitate future blending of fibres taken from different bales.

A further object of the invention is to provide an apparatus as aforesaid including conveyor means for receiving individual fibre strips removed from the bales and transporting such strips to a remote location for further handling.

Still another and further object of the invention is to provide an apparatus as aforesaid having fibre gripping means borne by a moveable base means which can be controllably advanced to position the gripping means for removing fibre strips from successive portions of individual bales.

Other and further objects and advantages of the invention will become apparent from the following detailed description and accompanying drawings in which.

Referring now to the drawings, the apparatus of the invention has a carrier means in the form of a housing 4 which can be moved vertically by an elevating apparatus and in which two parallel shafts 2 and 2' with the journals 3 and 3' and 13 and 13' are rotatably mounted. Pairs of grippers 1-1' are fastened to these shafts which are of square cross section in their middle portion. The journals 3 and 3' of the two shafts 2 and 2' extend out of the housing 4 and bear cranks 5 and 6 which are rigidly fastened to them and on which the links 7 and 8 are articulated by means of pins 5' and 6', respectively. A bar 9 is articulated to the opposite ends of these links by means of the pin 9'. The upward and downward movement of bar 9 by means of a suitable drive, such as a pneumatic cylinder 93 (FIG. 1) or electrical solenoid drive, makes shafts 2 and 2' turn in opposite directions and thus the pairs of gripper fingers 1-1' are opened or closed. In the bearings 10 and 10' fastened to housing 4 (FIG. 2 or 3), vertical slide rods 20 and 20' are displaceably mounted, to the bottom ends of which horizontal hold-down rods 21 and 21', respectively, are fastened, which rest upon the bale. Collars 22 and 22' prevent rods 20 and 20' from dropping down out of bearings 10 and 10' with the hold-downs 21 and 21' when housing 4 is elevated.

Figure 1:
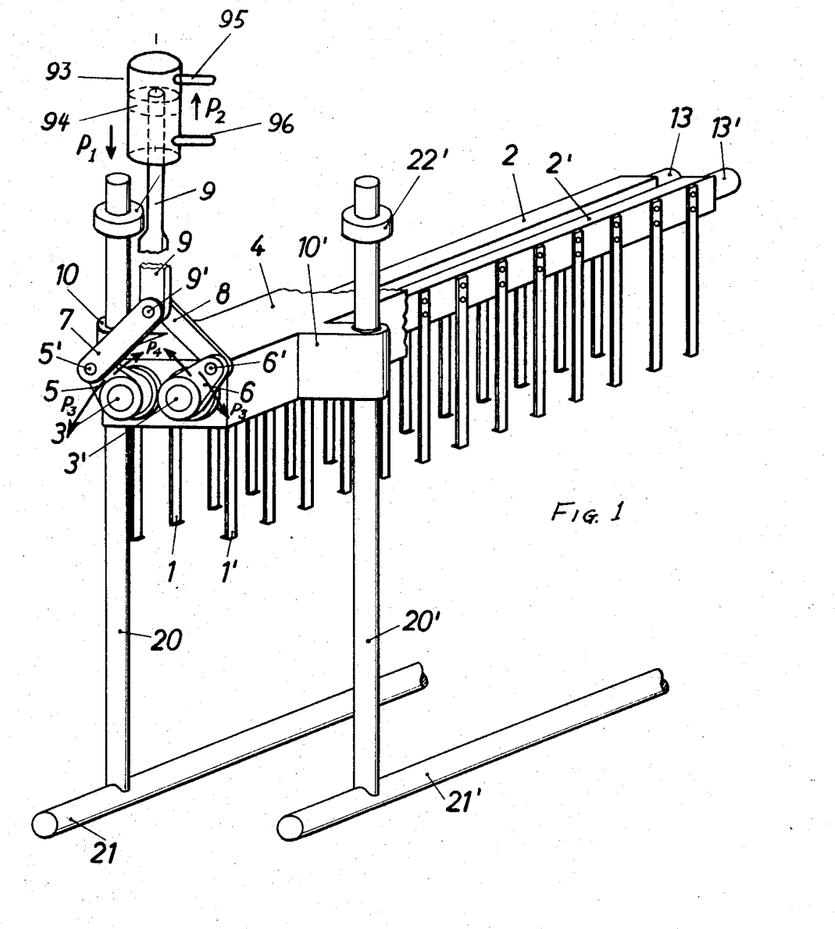
FIG. 1 is a partial perspective view of the apparatus according to a preferred embodiment of the invention, showing the carrier means, hold-down members, and the gripping fingers as mounted to the carrier means.
Figure 5:
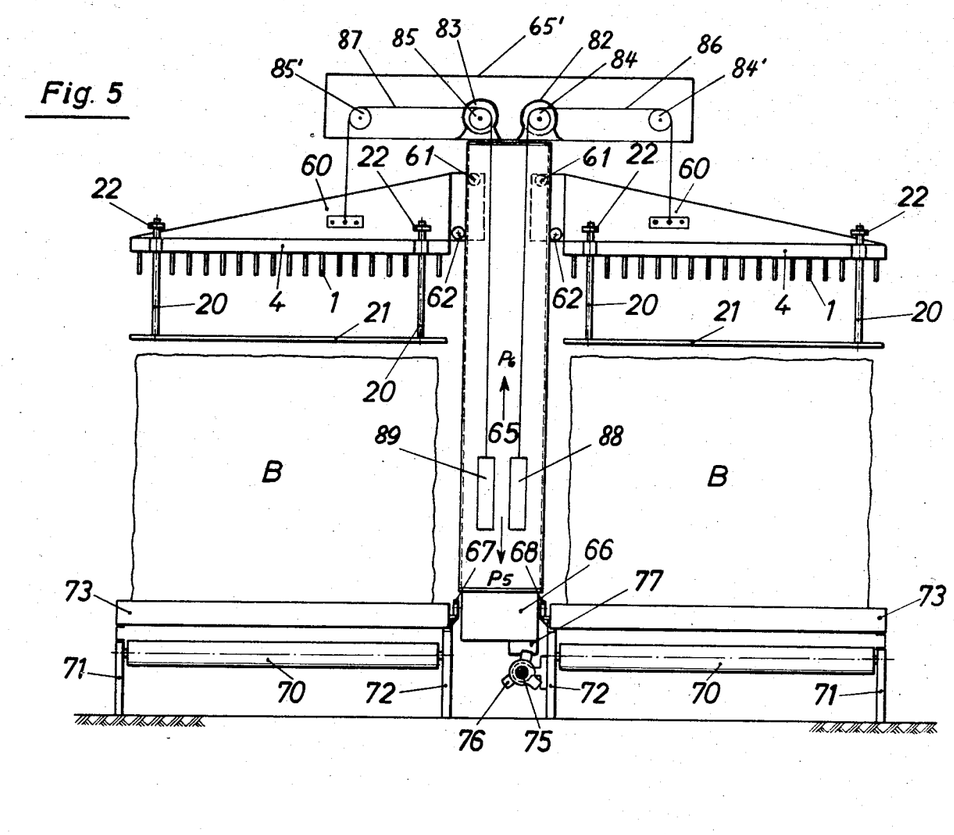
FIG. 5 is a schematic elevation view of an apparatus according to another embodiment of the invention which features a pair of carrier means and gripping finger combinations borne by a common base means which is moveable along a guide track extending between rows of bale supports.

Referring now to the arrangement shown in FIGS. 1 and 5, whenever compressed air is introduced through the port 95 of cylinder 93, a lifting piston 94 is moved in the direction of the arrow P1. Simultaneously, air escapes through cylinder port 96. Through the movement of the lifting piston 94, the bar 9 is also moved in the direction of the arrow P1. Thus, the links 7 and 8 and cranks 5 and 6 which are rigidly connected to the journals 3 and 3' of shafts 2 and 2' respectively, are pushed in the direction of the arrow P3, whereby the pairs of grippers 1, 1' are closed. To open the grippers 1, 1', compressed air is introduced through the port 96, with the other side of piston 94 being vented through port 95, and the bar 9 is moved in the opposite direction as indicated by the arrow P2.

FIG. 5 shows the arrangement of the gripping device on a column 65 that can travel on rails. Between two platforms 73, on which the fibre bales B are placed, the column 65 is fastened onto a carriage 66 with wheels 67 and 68, so that it can be moved along the rows of bales. The two gripping devices 60 are disposed by means of rollers 61 and 62 so as to be vertically movable on column 65, an appropriate driving system for this vertical movement being housed within the column 65. Each individual bale lies upon a platform 73, a gap being left between the platforms for the descent of the fibre material removed by the gripper. Beneath each of the rows of bales there is a belt conveyor 70 which runs between the uprights 71 (and 72), and which carries away for further processing the material thrown down by an opener through the gaps between the platforms 73.

Figure 6:
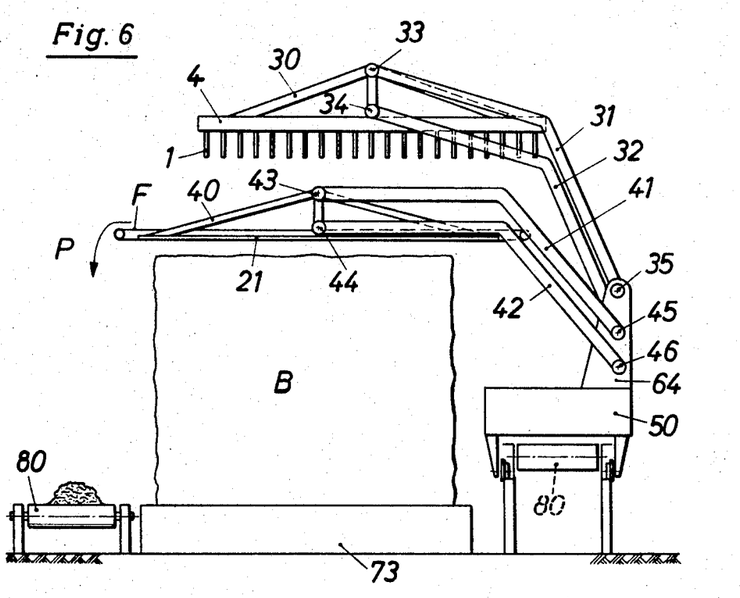
FIG. 6 is a schematic elevation view of an apparatus according to a further embodiment of the invention wherein the base means travels along a guide track extending along one side of the bale supports, a belt conveyor means extends along the other side thereof, and fibre strip removal is effected by gripping fingers which are positioned by a pivotable boom extending from the base means, and a transfer conveyor carried by the base means is provided to transport fibre strips released by the gripping fingers onto the belt conveyor.

The manner of operation of the apparatus described is as follows:

The housing 4, along with the hold-downs 21 and 21' and the two shafts 2 and 2' bearing the gripper pairs 1-1' (FIGS. 1 and 5), is moved up and down during the working process by a conventional mechanical or hydraulic lifting device, such as a screw or a hydraulically operated piston in column 65, or by arms 31-32 and 41-42, respectively (FIG. 6). On the travelling column 65 there is mounted a housing 65' to which motors 82 and 83 are fastened. On the output shafts of the motors 82 and 83 there are mounted sprockets 84 and 85 respectively. These sprockets 84 and 85 mesh with chains 86 and 87 respectively, which in turn pass around and engage additional sprocket wheels 84' and 85'. Chains 86 and 87 are secured each to one of the gripping finger carriers 60. In order to counterbalance the weight of these gripping finger carriers 60, counterweights 88 and 89 are fastened to the other ends of the chains 86 and 87. The motors 82 and 83 are expediently electric motors of the reversedly rotatable type, so that in order to lower the gripping finger carriers 60 onto the fibre bales B as shown in FIG. 5, the motors 82, 83, or either one of them are operated in one rotation direction to drive corresponding sprocket wheels 84, 85 so that the appropriate counterweight (or counterweights) 88, 89 are lifted upwards in the direction of the arrow P6. The gripping finger carriers 60 thereby are lowered vertically and will be guided along the column 65 by means of rollers 61 and 62. During the movement of the gripping finger carriers 60 against the fibre bales B, the sliding rods 20, 20' are moved upwards by the hold-downs 21, 21' in the bearings 10 and 10', until the pairs of grippers 1, 1' have reached a predetermined depth of penetration into the fibre bales B, in which event motors 82 and/or 83 are switched off. When the grippers 1, 1' have grasped a strip of fibre material, the motors 82 and 83 are operated in the reverse direction of rotation to lower the counterweights 88, 89 in the direction of the arrow P5 and thereby lift the gripping finger carriers 60 upwardly from the fibre bales B. The hold-downs 21 and 21' fastened to the sliding rods 20 and 20' apply themselves by their own weight to the material when the gripping system is lowered, the sliding rods 20 and 20' sliding upwards in bearings 10 and 10' as the gripping system continues to descend. The hold-downs 21 and 21' in this case simultaneously serve as feelers, in that, after the sliding rods 20 and 20' have moved a certain distance, the lowering of the gripping device is terminated. In this manner, a uniformly deeper penetration of gripper pairs 1-1' into the fibre bales is achieved, independently of the height of the bales. The opened gripper pairs 1-1' penetrate into the top layer of the bale B (FIG. 2) and are closed by the downward thrust of the bar 9. In this manner, the fibre layer located between the grippers 1-1' is gripped, released from the bale, and lifted up from the bale by the upward movement of the gripping system. The hold-downs limit the width of the fibre strip Bs released from the fibre bale B and prevent the lifting of a pad extending over the entire surface of the bale. At a certain point which can be adjusted by the collars 22 and 22' on the sliding rods 20 and 20', the hold-downs 21 and 21' are also lifted up from the bale B in the upward movement of the grippers, and the system is moved by means of carriage 66 to the next bale. As soon as the gripping system, in moving along the rows of bales together with the strip of fibres Bs lifted from the bale, is over a gap between the bales, the gripper pairs 1-1' open and drop the material onto the conveyor belt 70 running under the platform 73. As soon as the gripping system has arrived over the next bale, the process described is repeated.

Figure 4:
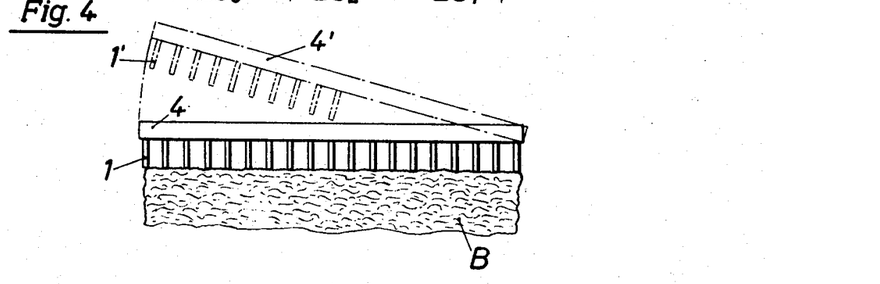
FIG. 4 is a schematic illustration showing how the carrier means and fingers can be raised by upward tilting as may be desired in lieu of direct vertical lifting to peel off from the bale strips of fibres gripped by the fingers.

The movement of the gripping system in relation to the bales B and the plucking out of the fibre material can also be performed as shown in FIG. 4, in which the housing 4, together with the gripper pairs 1-1' and shafts 2 and 2' are not lifted vertically, but pivots upward into the position shown in broken lines. This has the advantage that the plucking up of the fibre strip Bs which is held by gripper pairs 1-1' and extends over the entire breadth of the bale B commences at one side of the bale B and then continues over the entire width of the bale, thereby achieving an easier and gradual release of the material from the bale.

Figure 2:
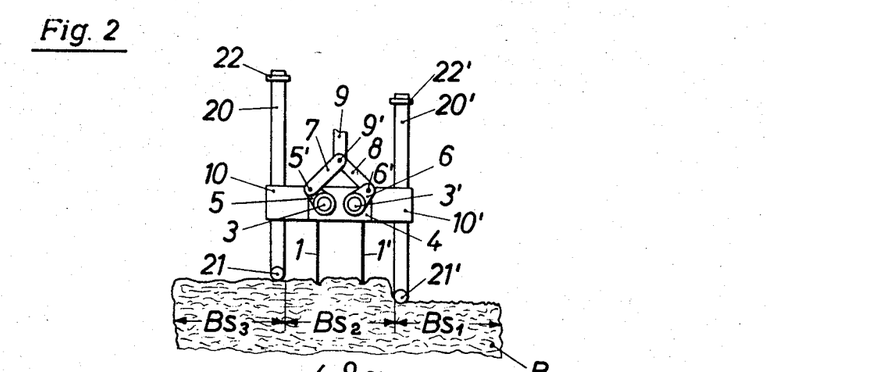
FIG. 2 is a schematic illustration, in an elevation view, of the apparatus portion shown by FIG. 1, as seen in a condition preparatory to gripping a strip of fibres for removal from a typical bale.
Figure 3:
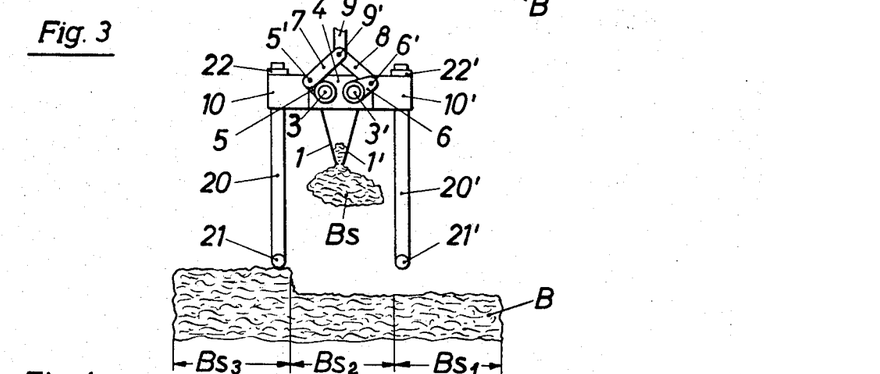
FIG. 3 is a schematic illustration of the apparatus portion shown by FIGS. 1 and 2, as seen when the carrier means has been raised to remove a strip of fibres gripped by the fingers.

In order that the material may be removed uniformly from the entire breadth of the individual bales B, the pairs of grippers 1-1' engage in each pass another place on the bale B. In FIGS. 2 and 3, three areas of engagement, Bs1, Bs2, and Bs3, are indicated by way of example. The removal of the layers in different zones Bs1, Bs2 and Bs3 is achieved by a controlling system that is in the prior art, as for example the one shown in FIGS. 5 and 5a. Beneath the rails of carriage 66 is located a cam shaft 75 with cams 76 which are offset in such a manner that lug 77 of carriage 66 engages each time on the cam 76 that is turned upward, and the carriage is thus stopped in three positions corresponding to zones Bs1, Bs2 and Bs3, on each bale platform 73. The control system brings it about that, in each pass of the gripping device through the rows of bales, the gripper stops at a different place on bale B.

In the case of fibres in layers that stick strongly together, it is also possible to peel off a layer extending over the entire width of the bale, in which case the hold-downs 21 and 21' can be taken out of operation.

For this purpose, too, a plurality of pairs of grippers can be disposed alongside one another to increase the output of the apparatus. The individual strips of fibres are then dropped overlappingly on one another on the continuously moving conveyor, and carried to a blending opener for further working.

Figure 7:
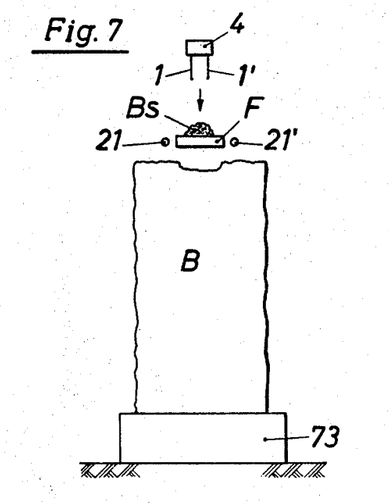
FIG. 7 is a schematic illustration of a portion of the apparatus shown in FIG. 6 and showing how the transfer conveyor is swung under the gripping fingers to catch a fibre strip released thereby.
Figure 8:
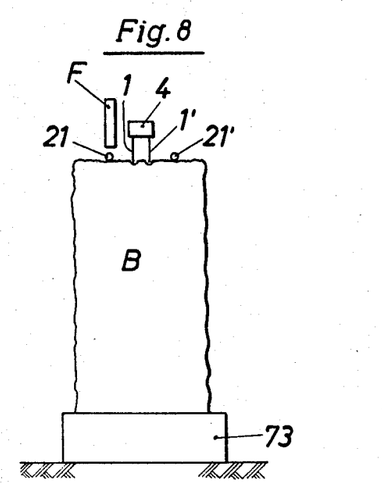
FIG. 8 is another schematic illustration similar to that of FIG. 7 but showing how the transfer conveyor is swung out of the path of the gripping fingers to allow unobstructed bale gripping action thereby.

In FIGS. 6, 7 and 8, another way of designing the gripping device according to the invention is shown. The gripper pairs 1-1' are lowered together with housing 4 by means of arms 31 and 32 which cooperate in the manner of a parallelogram, and which are connected by articulations 33 and 34 to the support 30 of the gripping device and by articulations 35 and 45 to the base 64 traveling on carriage 50. The hold-downs 21 and 21' are in this example fastened independently of the gripping device to two similar arms 41 and 42 by means of articulations 43 and 44, together with a belt conveyor F, the arms being likewise fastened by means of articulations 45 and 46 to the base 64. An additional lifting apparatus produces the vertical swinging movement of arms 41 and 42 and thus the adaptation of the hold-downs to the bale height. While the gripper pairs 1–1' are penetrating into the surface of bale B, the hold-downs 21 and 21' are lowered. The belt conveyor F, which, like the hold-downs, is mounted on the support 40, is folded back sideways as shown in FIG. 8 before the gripping device is lowered. After the lifting of the fibre strip, the belt conveyor F is returned to its position so that, when the grippers 1–1' open, the removed fibre strip drops onto the conveyor belt (FIG. 7) and, as indicated in FIG. 6 by the arrow, is thrown down onto a main conveyor belt 80. To save space, the belt conveyor 80 can also be disposed between the rails supporting the carriage 50. Before the re-lowering of the gripper pairs 1–1' onto the next bale B, the belt conveyor is returned again to the vertical position shown in FIG. 8, in order to avoid interfering with gripper pairs 1–1'. The system using the retractable belt conveyor F has the advantage that no space has to be left between the individual bales B for the dropping of the fibre strip Bs, and thus the installation requires less space.

Figures 5A, 10:
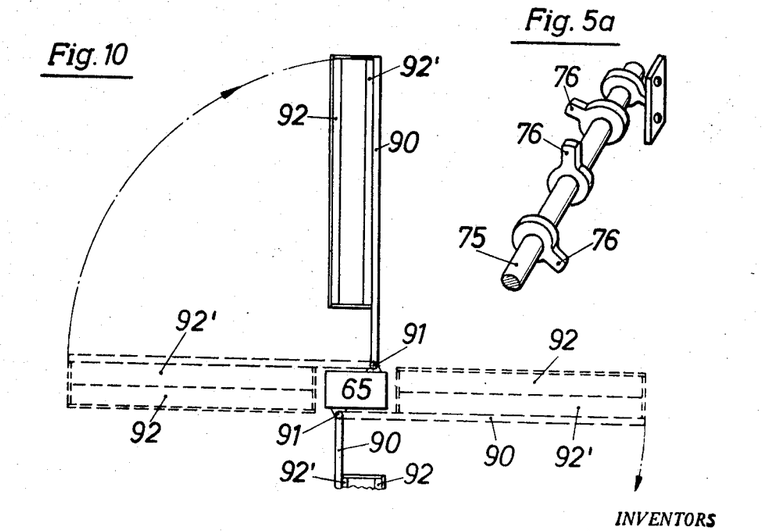
FIG. 5a is a perspective detail view of a part used in the apparatus of FIG. 5 to control the advancement of the base means for removal of successive fibre strips along the length of any give bale.
FIG. 10 is a schematic plan view of a portion of the apparatus shown in FIG. 9, showing how the gripping fingers are swung about the base means between positions overlying the bales and positions overlying the belt conveyor.
Figure 9:
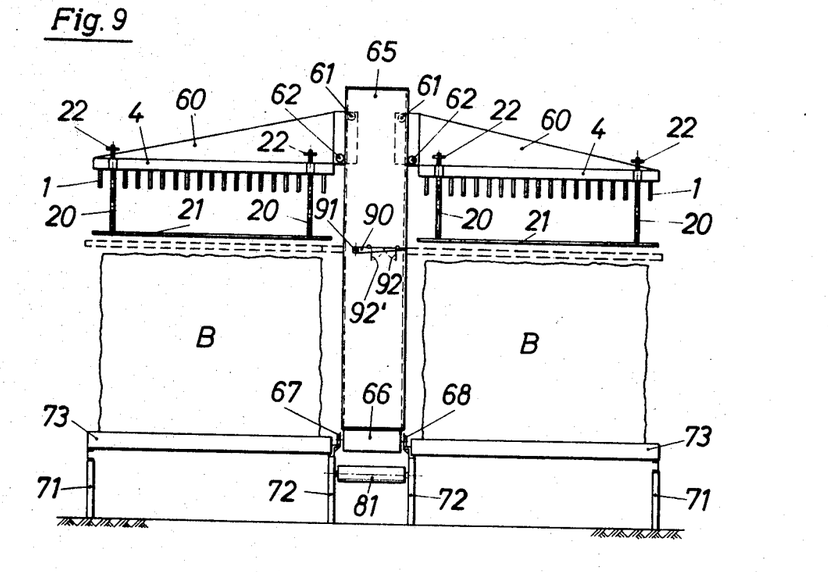
FIG. 9 is a schematic elevation view of an apparatus according to still another embodiment of the invention, in some respects similar to that of FIG. 5, but wherein the gripping fingers are swung about a generally vertical axis to drop fibre strips onto a belt conveyor running between the rails of the base means guide track.

Another embodiment of the apparatus according to the invention, in which no space is needed between the individual bales, is shown in FIGS. 9 and 10.

On the column 65, a pivoting arm 90 with flaps 92 and 92' is pivotingly fastened to a bearing 91 for each pair of grippers 1–1'. Between the two middle platform supports 72 underneath the rails for the carriage 66 is located a belt conveyor 81 to receive the fibres removed from the bales.

The gripper pairs 1–1' operate as already described with reference to the embodiment in FIG. 5, but with the difference that, after the gripper pairs 1–1' have plucked a fibre strip Bs out of the bale B and lifted it up, so that the hold-downs 21 hang free, the pivoting arms 90 are swung beneath the gripper pairs 1–1', as indicated in FIG. 9 by the broken lines. Flaps 92 and 92' are at that time closed. Gripper pairs 1–1' are thereupon opened, and the fibre strips broken out from the bales B drop onto the flaps 92–92', whereupon the pivoting arms again swing 90° out of the reach of the gripper pairs 1–1'. The pivoting arms 90 then are above the conveyor belt 81, as shown in FIG. 9, so that, when the flaps 92–92' open, the fibre material drops onto the conveyor belt 81. The opening and closing of flaps 92–92' takes place according to the position of the pivoting arms 90. The actuation of the pivoting arms 90 with flaps 92 and 92' can be performed at the moment in which the column 65 is advanced to the next bale of fibres.

The gripper pairs 1–1', located opposite one another pair-wise, can also be so constructed that they can be opened or closed individually. It is furthermore possible to construct the gripper pairs 1–1' as two-armed levers and mount them in housing 4 on only a single shaft 2, the gripper fingers corresponding to one another pivoting about a common shaft when opening and closing, as in the case of a pincer.

As can be readily noted from the foregoing, the apparatus of the invention in each of its various embodiments is essentially the combination of a base means, a carrier means, and a plurality of finger members.

The base means is preferably moveable along a guide track or rails as exemplified in FIG. 5 by the column 65, in FIG. 6 by the combination of the base member 64 and carriage 50, and in FIG. 9 again by the column 65.

In general, the carrier means, as used herein is intended to designate such elements as cooperate to support the finger members 1 for movement relative to one another and relative to the base means and bales B. For example, the housing 4 can be regarded as a principal elements of the carrier means. The carrier means essentially operates to bring the fingers 1 into gripping contact with the bales, and to transport the fibre strip removed by the fingers 1 to a position where they can be deposited by gravity (free fall) onto a receiving means.

The receiving means can be defined by a single conveyor 81 as in FIG. 9, wherein two rows of bales B are serviced, or by individual conveyors 70 for each row of bales B, as in FIG. 5, or by the combination of a main conveyor 80 and a transfer conveyor F, as in FIG. 6.

The invention is therefore susceptible of numerous modifications and variations as exemplified by the foregoing description of the drawing figures, as well as other modifications and variations that will become obvious to the artisan from the disclosure of the invention herein. However, the invention is intended to be limited only by the following claims in which we have endeavored to claim all inherent novelty.

What is claimed is:

1. In an apparatus for opening fibre bales having fibre removing means movable in and out of fibre removal engagement with a fibre bale positioned adjacent thereto, the improvement which comprises carriage means for moving said fibre removing means along a predetermined path of travel, stationary bale support means for supporting fibre bales along said path positioned for said carriage to move said fibre removing means in position adjacent thereto for actuation into fibre removing engagement, and means adapted to limit the depth of engagement of said fibre removing means with respect to said bale whereby to permit grasping and removal of a fibre mass of predetermined thickness from said bale.

2. An apparatus for removing strips of fibres of predetermined thickness from bales of fibres, which apparatus comprises a base means, receiving means, a carrier means supported by said base means and disposed for movement relative thereto into a position of proximity with respect to a bale of fibres to receive strips of fibres removed therefrom, and for movement into a position to deliver such fibre strips to said receiving means, a plurality of finger members supported by said carrier means for movement therewith, said finger members being operatively associated with positive guide means adapted to guide said finger members to a predetermined portion of said bale, said finger members being positively pivotally movable toward one another to grip fibres contained in said bale for removal of a fibre mass therefrom, said finger members being postively pivotally movable apart from one another to accommodate the delivery of such fibre mass to said receiving means, and means adapted to limit the depth of engagement of said finger members with respect to said bale whereby to permit grasping and removal of a fibre mass of predetermined thickness from said bale.

3. The apparatus according to claim 2 wherein said finger members are disposed in a pair of parallel rows, each row including a similar number of finger members arranged in opposite relation to corresponding finger members of the other row, each row has a shaft member supported by said carrier means for movement therewith, said shaft members being disposed in parallel relation to each other and each connected to the finger members of a corresponding row thereof to support said finger members in parallel rows for movement with the carrier means, said shaft members being disposed for limited pivotal movement relative to the carrier means and in opposite directions with respect to each other to pivot said rows of finger members positive toward and away from each other to respectively grip fibres in the bale for removal in strips therefrom and to accommodate the delivery of such strips to the receiving means.

4. The apparatus according to claim 3 including a linkage means connected to said shaft members and disposed for connection to an actuator means to positively drive and selectively pivot said rows of finger members in unison toward each other into a fibre-gripping position and away from each other into a fibre-releasing position.

5. The apparatus according to claim 4 including an actuator means supported by said base means and connected to said carrier means to selectively move same and the finger members therewith into a position of proximity with respect to said fibre bale to accommodate the gripping by said finger members of fibres within said bale, and to selectively move the carrier means away from the bale to remove such gripped fibres therefrom in a strip to a delivery position.

6. The apparatus according to claim 5 wherein said actuator means is connected to the carrier means to move same along a substantially vertical linear path between said fibre-gripping and delivery positions.

7. The apparatus according to claim 2 including a guide track means, and at least one bale support means disposed at a predetermined position along the path defined by said guide track means, and wherein said base means is disposed for movement along said guide track means to position said carrier means and the fibre gripping fingers for removing strips of fibres from successive positions of bales disposed upon said bale support means.

8. The apparatus according to claim 7 including a main conveyor means extending along a path generally parallel to that defined by said guide track means and passing by each bale support means, said conveyor means being disposed to receive fibre strips removed from bales upon said bale support means by said gripping fingers and to convey such fibre strips to a remote location.

9. The apparatus according to claim 8 wherein said bale support means are disposed at separated spaced apart locations along said guide track path, and said main conveyor means extends underneath each of said bale support means to receive fibre strips dropped by said gripping fingers as they travel with the base means over portions of the conveyor means lying between successive bale support means.

10. The apparatus according to claim 8 including a transfer conveyor means supported by said base means for movement therewith, said transfer conveyor means being disposed to receive fibre strips from said gripping fingers and to transfer such fibre strips along a path extending transversely to the guide track path onto said main conveyor means.

11. The apparatus according to claim 8 wherein said main conveyor means extends underneath said guide track means and said carrier means is connected to said base means for pivotal movement relative thereto from a position overlying said bale support means to a position overlying said main conveyor means to respectively grip and remove fibre strips from bales upon said bale support means and drop such fibre strips upon said main conveyor means.

References Cited

UNITED STATES PATENTS

| | | | |
|---|---|---|---|
| 3,085,296 | 4/1963 | Meinicke | 19—81 |
| 3,319,813 | 5/1967 | Beyea. | |

FOREIGN PATENTS

| | | |
|---|---|---|
| 165,391 | 3/1965 | U.S.S.R. |
| 216,959 | 8/1961 | Austria. |
| 534,202 | 12/1956 | Canada. |
| 577,030 | 5/1958 | Italy. |
| 660,837 | 4/1963 | Canada. |

OTHER REFERENCES

German printed application A 16,657 (1956).

DORSEY NEWTON, *Primary Examiner.*

PO-1050
(5/69)

UNITED STATES PATENT OFFICE
CERTIFICATE OF CORRECTION

Patent No. 3,443,285      Dated May 13, 1969

Inventor(s) GEORG GOLDAMMER and GÜNTER MAHRT

It is certified that error appears in the above-identified patent and that said Letters Patent are hereby corrected as shown below:

Column 4, line 58, cancel "by means of the pin 9'. The upward and downward"; column 4, line 60, before "movement" insert --by means of the pin 9'. The upward and downward--

SIGNED AND
SEALED
FEB 17 1970

(SEAL)
Attest:

Edward M. Fletcher, Jr.
Attesting Officer

WILLIAM E. SCHUYLER, JR.
Commissioner of Patents